(12) United States Patent
Sipe et al.

(10) Patent No.: US 7,792,683 B2
(45) Date of Patent: Sep. 7, 2010

(54) METHOD AND SYSTEM FOR ADDRESS INFORMATION DISTRIBUTION

(75) Inventors: Wayne Sipe, Mansfield, TX (US); Ben F. Bruce, Arlington, TX (US); Shahrom Kiani, Arlington, TX (US); Alan E. O'Martin, Coppell, TX (US); Gary Allen, Arlington, TX (US); John J. Mampe, Fort Worth, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1271 days.

(21) Appl. No.: 10/290,029

(22) Filed: Nov. 7, 2002

(65) Prior Publication Data

US 2004/0093222 A1 May 13, 2004

(51) Int. Cl.
*G06Q 99/00* (2006.01)
(52) U.S. Cl. ....................................................... 705/1.1
(58) Field of Classification Search ..................... 705/1, 705/401
See application file for complete search history.

(56) References Cited

U.S. PATENT DOCUMENTS

| | | | |
|---|---|---|---|
| 5,422,821 A | 6/1995 | Allen et al. ................. 364/478 |
| 5,454,038 A * | 9/1995 | Cordery et al. ............... 705/60 |
| 5,703,783 A | 12/1997 | Allen et al. ............ 364/478.01 |
| 5,889,897 A | 3/1999 | Medina ....................... 382/310 |
| 5,925,864 A | 7/1999 | Sansone et al. ............. 235/375 |
| 5,953,427 A * | 9/1999 | Cordery et al. ............... 380/51 |
| 5,974,147 A | 10/1999 | Cordery et al. ............... 380/25 |
| 6,028,970 A | 2/2000 | DiPiazza et al. ............ 382/309 |
| 6,373,965 B1 | 4/2002 | Liang .......................... 382/112 |
| 6,457,012 B1 * | 9/2002 | Jatkowski .................... 707/101 |
| 6,687,362 B1 * | 2/2004 | Lindquist et al. ........ 379/218.01 |
| 2001/0037463 A1 * | 11/2001 | Salta .......................... 713/201 |
| 2002/0059142 A1 * | 5/2002 | Krause et al. ................. 705/44 |
| 2003/0101226 A1 * | 5/2003 | Quine ......................... 709/206 |
| 2003/0114956 A1 * | 6/2003 | Cullen et al. ................ 700/225 |
| 2003/0182018 A1 * | 9/2003 | Snapp ......................... 700/225 |
| 2004/0044734 A1 * | 3/2004 | Beck ........................... 709/206 |
| 2004/0068518 A1 * | 4/2004 | McDowell ............... 707/104.1 |

OTHER PUBLICATIONS

Horne, Sabrina, "Cleaning up for better response," Catalog Age, v18n1, pp. 37, Jan. 2001.*
"Postal Service Crackdown on Undeliverable Mail Highlights Need for Cleaner Addresses." Business Wire, p. 0231, May 22, 2002.*
Mummert, Hallie, "From the list to the mail piece," Target Marketing, v18n9, pp. 23-25, Sep. 1995.*
Bekaert, Marijke, "How Rodale mails cleaner," Target Marketing, v21n9, pp. 61-62, Sep. 1998.*
www.Accudata.com, retrieved from Internet Archive Wayback Machine <www.archive.org>, Date Range: Aug. 16, 2001-Sep. 26, 2001.*
"ChangeAddress.com Moves into Action with a $1.6 Million Capit Infusion," www.changeaddress.com website, 5 pages.

* cited by examiner

*Primary Examiner*—Jonathan Ouellette

(57) ABSTRACT

A method for providing address change information to subscribers wherein a national postal service maintains a master change of address database that is updated on an intermittent basis by the national postal service includes the steps of: (a) receiving intermittent updates to the master change of address database and incorporating the updated change of address information into a computer-searchable, enhanced change of address database, (b) receiving change of address data from sources other than the national postal service and postal patrons who are submitting address change information, (c) incorporating the change of address information received from such sources into the enhanced change of address database; and (d) distributing information from the enhanced database to one or more of the subscribers.

20 Claims, 3 Drawing Sheets

METHOD AND SYSTEM FOR ADDRESS INFORMATION DISTRIBUTION

TECHNICAL FIELD

The present invention relates to the automated distribution of information, in particular to lists of address information.

BACKGROUND OF THE INVENTION

Individuals and businesses changes addresses frequently, but information concerning the change of address is usually not available at the time a move becomes effective, resulting in a large waste of resources by businesses that send mailings to incorrect or former addresses. The U.S. Postal Service (USPS) has both a manual and online change of address procedure, but many times the change is entered manually by a USPS employee and it may be days before it becomes effective.

Allen et al. U.S. Pat. No. 5,422,821 describes a system wherein mail piece addresses and bar codes are scanned and checked against a forwarding address database so that forwarding to the new address can occur without first sending the mail piece to the old address. This helps improve the efficiency of the forwarding process but does not address the underlying problem that the mail has been directed to the old address in the first instance.

Address changes eventually find their way into the National Change of Address (NCOA) database maintained by the USPS. The USPS licenses this database to selected licensees who permit businesses to access copies of it to obtain change of address information. The information in this database is not current, i.e., changes of address are delayed by the time it takes the consumer to complete the COA procedure and the time it takes the postal service to key in the change of address information and add the change to the NCOA.

In a typical procedure currently in use by a mass mailer, the mailer first collects data to obtain the names and addresses of consumers it would like to contact. It obtains this information from a variety of sources, such as commercially available mailing lists, lists of customers of another entity it has entered into a transaction with, consumer surveys, lists provided by government entities (e.g., businesses listed with the Secretary of State), and customer replies such as returned rebate forms. The data is converted into a uniform working format. The mailer then compares the entries on the list in order to update the data, i.e., find and correct any old addresses and revise the mailing list to reflect the consumer's current address. The NCOA and other postal databases are used for this purpose, along with any available databases from non-postal sources. The corrected list is then purged of consumers that should not be contacted, such as persons who are on a do not mail list. The Direct Mailer's Association (DMA) maintains a list of consumers that have registered with the DMA in order to not be contacted with direct mail solicitations. At this point, the mailing is created and sent out based on the revised and corrected list. This procedure is partially effective at avoiding wasted mailings to the wrong address, but will be ineffective to the extent that the change of address database(s) such as the NOCA used to generate the mailing list are not current.

Current list processes and change of address data available to commercial businesses are not timely. Present systems are not effective in locating address change data. Businesses purchasing a NCOA license receive weekly COA updates. Current statistical data indicates that an average of 118,000 address changes occur daily, or 826,923 moves per week. Household moves create mail that cannot be delivered, resulting in lost or delayed information, mail, and parcels to consumers and results in time and money lost to a business. Present processes require that Undeliverable as Addressed mail and parcels are returned to the sender or forwarded according to standardized rules. This process is both costly and time consuming. Present systems and processes are not timely and are not readily available to the public. A need therefore remains for a system for distributing change of address database on a more rapid basis.

SUMMARY OF THE INVENTION

A process according to the invention takes daily address information and uses it to update the United States Postal Service (USPS) NCOA database, creating a new database that is current daily. The new database will assist businesses in making corrections to address information prior to printing address labels and delivering the items to a mail or parcel service provider. This process will enable the collection of address change information at near real time, validate the change information, and distribute this new database to licensed users on a daily or more frequent basis.

The invention in one aspect provides a method for distributing change of address information more rapidly than is possible with the national change of address (NCOA) database maintained by the U.S. Postal Service. In particular, a method for distributing change of address information more current than a master postal change of address database such as the NOCA includes the steps of:

(a) obtaining information concerning changes of address from sources other than the master change of address database, which information is more recent than address changes reflected in the master database;

(b) compiling such recent address change information into a computer-searchable enhanced change of address database; and (c) distributing information from the enhanced database to one or more customers. In a preferred form of the method, the enhanced database is updated with change of address information forwarded to the enhanced database by customers, which information is combined with the daily change of address data due for inclusion in the master database.

A system for distributing change of address information more current than a master postal change of address database, includes means for electronically obtaining information concerning changes of address from sources other than the master database, which information is more recent than address changes reflected in the master database, a computer-searchable enhanced change of address database containing such recent address change information, means for compiling such recent address change information in order to create updated versions of the computer-searchable enhanced change of address database, and means for distributing information from the enhanced database to one or more customers. Such means will generally comprise suitable software and computer and network hardware as needed to run such software. The means for distributing information to customers is most preferably a system that transmits such information through a network, but also includes other conventional options for distributing machine readable data, such as sending a data storage device (DVD, CD, hard drive or the like) having the information saved thereon in machine-readable form to the customer. Similarly, a "database" for purposes of the invention is any organized compilation of the referenced information that is machine-readable, such as a table in memory or a file containing address data records saved on a permanent storage device such as a hard drive or DVD. In the foregoing system, it is preferred to also provide a copy of the master database and suitable means for searching both the enhanced database and master database in response to a customer request.

Subscribers will use the enhanced database in a variety of ways. Some subscribers that have a existing customer list to be checked against the enhanced database at the time a mailing is created. To expedite this, the mailer can provide a copy of the customer list to the enhanced database provider in advance, and the provider compares it to the enhanced database to create a fast address change lookup table. The subscriber then receives access to the lookup table and may check it prior to making a mailing. In the alternative, upon receiving a mailing list from the subscriber, a revised version of the mailing list is prepared using data corresponding to addresses on the subscriber's mailing list from the enhanced database, and the revised mailing list is sent back to the subscriber.

According to a further aspect of the invention, data from the master database is used to create a long-term move history database. The U.S. postal service only maintains records of old addresses for the last 3 years. However, there may be instances such as a search for a missing person wherein older former addresses may be of interest. Accordingly, the move history database maintains records of moves with no limit on how long the information is retained, e.g. 10 or 20 years or more, creating a chain of moves for a given postal recipient. These and other aspects of the invention are further described and discussed in the detailed description that follows.

BRIEF DESCRIPTION OF THE DRAWING

In the accompanying drawing, wherein like numerals represent the same or similar elements throughout.

DETAILED DESCRIPTION

Change of address data comes primarily from the USPS on a weekly basis and is called National Change of Address (NCOA) database. The NCOA database is made available weekly to licensed users. The process of the invention provides a method to capture, manipulate and distribute change of address data on a daily basis.

Figure 1:
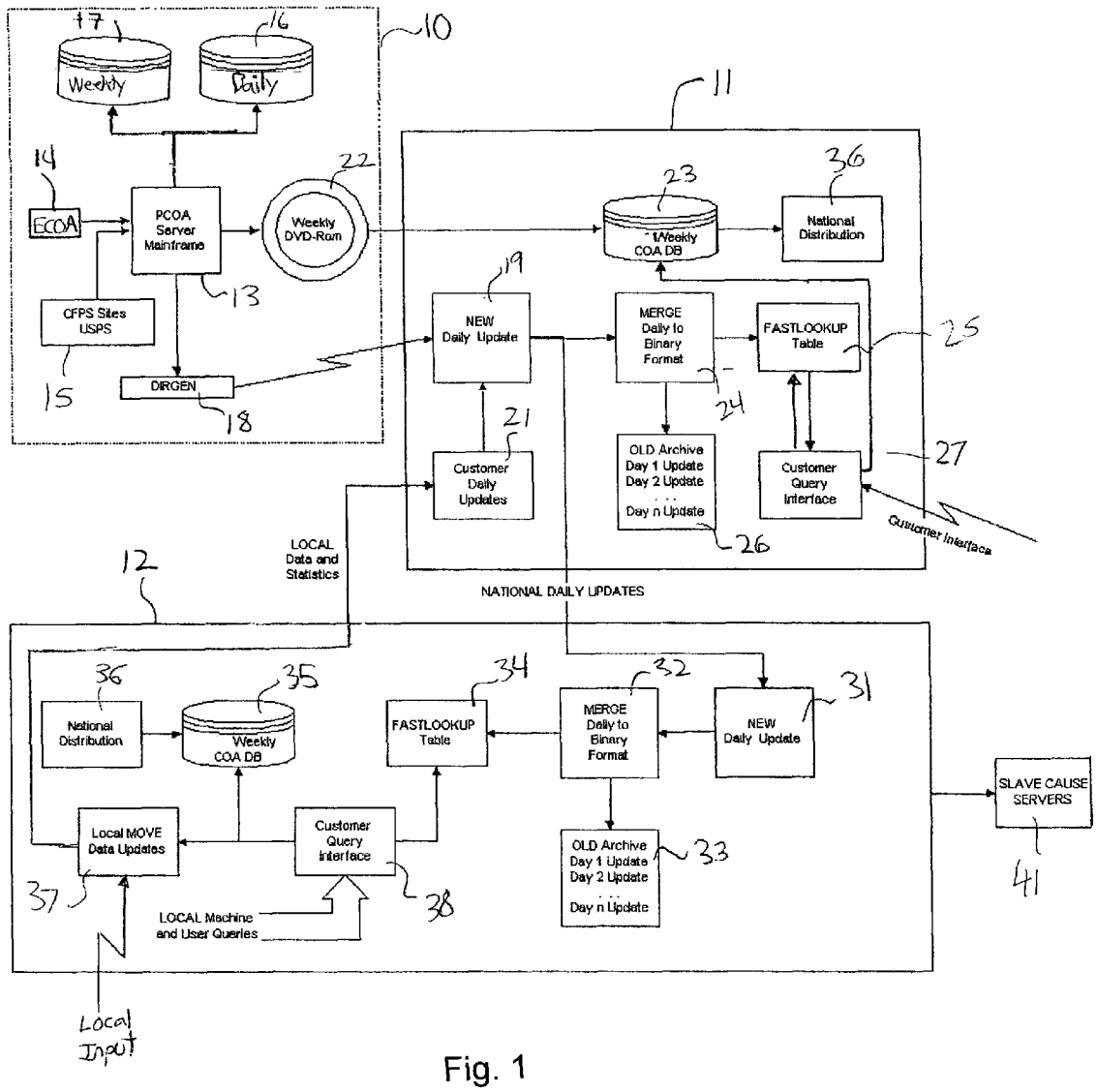
FIG. 1 is a schematic diagram of an information system according to the invention.

Referring to FIG. 1, one embodiment of the process of the invention involves data communication between the USPS National Customer Support Center (NCSC) site 10 or an NCOA licensee, a central change of address update server 11, and a number of customer servers 12. Server 11, which may be located at site 10 or may be privately operated, communicates with USPS's COA mainframe computer 13 through a network. Baseline change of address data comes daily to NCSC 10 as a result of scanning of change of address forms submitted by consumers, such as by the process described in commonly assigned U.S. Pat. No. 6,741,724, issued May 25, 2004 to Bruce et al. for a Method and System for Form Processing, the contents of which are hereby incorporated by reference herein, and by electronic change of address (ECOA) system 14 provided by the USPS. The scanning of address forms may be carried at postal processing and distribution centers (P&DC's) that for this purpose each operate a computer form processing system (CFPS) 15. Updates are accumulated on a daily national move database 16 and are posted once per week to an official national move database 17, such as the NCOA. Database 17 is preferably a historic database, or else archives its older records to a separate historical database, maintaining a history of moves that occurred within a predetermined period of time, such as the last 5 or more years, e.g., 5, 10, 15 or 20 years.

Central change of address update server ("CAUSE" server) 11 maintains and accumulates address change updates from a variety of sources. Daily update information from postal daily database 16 is compiled by directory generation (DIRGEN) software 18 and transmitted to server 11. CAUSE server 11 also receives updates of local address data and optionally mailing statistics from customer servers 12.

The national daily updates, weekly updates delivered on DVD disc 22, and customer daily local data updates are each subject to potential errors and are therefore preferably validated using validation software before use in the system of the invention. Validation procedures may be elaborate or complex, and many such are presently in use. Gross error checking may be carried out to verify that the date of the change is valid (more recent than the last received) and that the data does not contain corrupt records containing invalid characters. Validation can also involve enhancement of the address data, for example consulting the USPS AMS2 (Address Management System 2) database for street addresses, and also checking tables for aliases, building names and the like. New data may then be added to the record, such as the name of a building, in addition to its street address. Variant names known to be associated with the same recipient may be normalized to a single standard form. As a minimum the old address is double checked against a national database of valid addresses to verify that the address exists, and that the recipient lived there. Verification that the new address exists may also be carried out. In the event that a change of address record cannot be validated, it can either be dropped or flagged as suspect and retained, along with an error message or explanation of which validation could not be completed. Some addresses, such as those addressed to military personnel, cannot be address verified but nonetheless need to be retained in the system.

Weekly updates from database 17 are sent on DVD 22 or in any other convenient form and incorporated into a weekly national change of address database 23 stored on server 11. Customer daily updates received by update input software 21 are forwarded to daily update software module 19, which receives the daily update from DIRGEN (Directory Generation Process) 18. These two sources are each validated and combined. In the event of a conflict between an address change reported by a customer server and one reported as part of a daily update from the NCSC, rules of priority are established as to which change will take precedence in the merged data. The operator of server 11 may opt to trust local data reported from a trusted customer as much as information received from the NCSC. In such a case, the most current (last to arrive) data will take precedence regardless of its source. A similar process must be followed whenever data is merged as described hereafter.

A copy of the merged daily update data is encrypted such as by Microsoft CryptoAPI, wherein user access and interfaces are protected through user accounts and passwords, such as are commonly available in the industry. In addition, it may be desirable to permit direct customer address requests to be processed directly at server 11. For this purpose, the daily update is converted by conversion software 24 to a binary form suitable for merging into a fast lookup table 25. Security access rules can be configured to assure that only valid address searches are performed. Lookup table 25 includes data received during the week that is more current than the last weekly update received from database 17. Once again, later entries override earlier ones as far as priority in the lookup table 25 is concerned. However, this does not require that the superceded entry be dropped from the table. Rather, the most current entry may be flagged as the preferred one in the table. This is useful insofar as a customer inquiry may ask for a single most recent address for a given recipient, or instead may ask for all recent COA data concerning the recipient. Lookup table 25 is preferably stored in memory for rapid access and to permit editing of the table "on the fly," that is, by changing the content of memory locations while the table is being read or written to by other processes. For purposes of the invention, a "fast lookup table" is a database set up as a series or array of discrete records or entries in a form that permits rapid computer access; the architecture and format of table 25 may vary. A copy of table 25 is written periodically to permanent storage media such as a hard drive for backup purposes. The daily backup data is also forwarded to an archive software module 26 that saves the daily updates in case they are needed later, such as to resolve a problem or determine whether a more recent update is a duplication of material previously received. Generally, this archive will be retained for only a limited time due to storage limitations, such as 30 days.

A customer that does not have its own server 12 may wish to have its mailing list checked against the data on CAUSE server 11. The customer interacts with a customer query interface module 27 that receives the customer address list and compares it to the data on CAUSE server 11. In general, this process preferably involves first checking each address against the fast lookup table 25. If a hit is found indicating a move, the address list is corrected to reflect the change and optionally a report is prepared for the customer listing the changes made. If no hit is found in table 25, the list is then compared against weekly COA database 23, and a similar procedure is followed if an address on the customer's list matches a move entry in the database 23. The more recent change of address data stored in table 25 will normally take priority over the older information in the weekly database 23. If the customer has requested a complete list of all changes of address or other events possibly indicating a move associated with an address or recipient, then corresponding entries from both database 23 and table 25 can be searched and listed in a report, subject to security authorization.

Server 11 and database 23 are used to prepare a national daily update that is sent to a master change of address server 12 located at each of the subscribing customer sites. This information is received by a daily update input software module 31 and passed to merge software 32 that converts it to a binary format in the same manner as software 24 described above. Daily data from merge software 32 is saved by an archive software module 33 that saves the daily updates in the same manner as described above for archive software module 26. The formatted data is then entered into a customer fast lookup table 34. In a system where multiple customers are contributing local data to server 11, lookup table 34 will take into account both official daily changes from the NCSC and local changes from all customers. Each customer maintains its own weekly COA database 35 that receives weekly updates 36 from server 11, which updates 36 correspond to the DVD update 22 received from the mainframe COA computer 13 at the NCSC. Each customer also maintains a database or fast lookup table 37 of COA data that has been input locally by the customer itself. This local data will generally consist of address changes the customer has been notified of directly, as by a consumer giving notice of a change of address to a bank or credit card company that maintains a customer server 12. As such, this data is more current than table 34 or database 35. Once per day this information is exported by each customer back to server 11 to the customer daily update software 21, as described above, so that other customers have the benefit of the information.

A customer query interface 38 is used whenever a local user at the customer wishes to check one or more addresses, such as prior to sending out billing statements or other mailings. In a typical process, the local move database 37 is consulted first, and if a match is found, the customer uses the updated address information found in database 37. Each customer is most likely to rank its own internal records highest in priority. If no match is found in database 37, then lookup table 34 and weekly database 35 are each consulted, in that order. In other words, move information in database 37 gets higher priority than lookup table 34 based on national updates and other customers' local data, and move information in table 34 gets higher priority than weekly database 35.

It has been found that use of local data according to the invention can improve address hit rates up to 20%. Local customer computer systems will query their CAUSE server 12 prior to running an address list or printing addresses. Customer COA master server 12, shown in FIG. 1, can provide corrected address data corrected in real time. To provide data to multiple systems requesting data in real time, change of address slave servers 41 are used. The slave servers 41 are maintained with the same databases that are stored in the master server 12. Slave servers 41 are updated periodically, such as daily, following an update to the customer master server 12. Local data is preferably validated prior to entry into database 37, or may be used as is, at the customer's option.

The present invention thus provides an enhanced change of address database that starts with a master change of address database such as the NCOA or an equivalent official COA database and provides enhancements to it from other sources. In the foregoing example, weekly, daily and local data are referenced as separate databases or lookup tables. This is a preferred structure for programming purposes, but it will be evident to those of skill in the art that other database architectures are possible. It may in some applications be useful to combine weekly, daily and local data into a single enhanced change of address database that may contain only a single entry per recipient, based on rules of priority, or may contain multiple entries per recipient which a customer may wish to evaluate.

As noted above in connection with validation, a number of external sources may be consulted for information that will be used to revise or supplement information received from the NCSC or other sources. The USPS maintains, for example, separate alias databases for both addresses and nicknames. Where one of the alias databases gives an alternative name or address for a postal customer references in the master database, the corresponding change is made in the enhanced database. The alias databases are updated from time to time and thus it is most preferred to compare the current master database such as NCOA with the alias database on a regular (daily or weekly) basis. The USPS also maintains a nickname list that tells the gender of a recipient, along with special titles such as military or educational titles (Captain, Colonel, Professor, etc.) which can be added to the enhanced database so that the correct title can be used in a mailing. The USPS further maintains a database of temporary moves that is separate from the NCOA. The enhanced database can be amended to reflect effective addresses during time ranges, so that mailings reach the recipient at the appropriate address.

Local data is not limited to contributions from customers. Some local data may be researched and obtained by the operator of server 11 and input in the same manner as local data sent from a customer server 12. A change of address may be reflected in the records of a non-customer credit card company well in advance of a corresponding change in the master database. Accordingly, where the credit card company database shows a move for a postal customer that is not yet reflected in the master database, the new address can be used in the enhanced database. Credit card companies and police also maintain theft of identity files. This information may be used, for example, to determine that an address appearing in the NCOA is incorrect and should not be used, that a postal recipient is a sham and does not exist, or the like. Police maintain hot lists of addresses to which mail is being intercepted or trapped and is unlikely to reach the recipient. A direct mailer may, for example, not wish to send advertising mailings to an address on this list, and thus the enhanced database reflects the hot list status of an address.

Municipalities maintain deceased files. If a person listed in the NCOA is recently deceased, the enhanced database reflects this and the mailer consulting the enhanced database may decide not to send a mailing to that address. County real estate records list the current owner of real property. This information can be compared to the master database to determine if correction in required in the enhanced database.

Federal government agencies may learn of a move before the information becomes part of the NCOA. For example, a taxpayer may indicate a change of address to the IRS. Accordingly, consulting an IRS address database may provide further updates to the enhanced database server 11. In the event of a natural disaster, the USPS or other governmental entities can provide advanced notice or areas in which mail cannot be delivered.

In some cases, a mailer may be interested in the formation of a new business as reflected in the records of the Secretary of State for the state in which the new business is incorporated. This data can be partitioned to permit or restrict selected files being accessed by individual customers, for example, only upon presentation of a court order. This information can be added to the enhanced database, permitting a mailing to reach the new business. Electronic address lists on the Internet may also be consulted and compared to the master database to detect a move. Electronic telephone or business listings on the Internet may be more current than the master database. These sources can be downloaded by FTP transfer or otherwise from specific URL's, either as files created by prearrangement with the provider, or as files already publicly available on the Internet, as public records or otherwise. In some instances, a change in telephone number may be an indication that a recipient has moved.

The software used to implement the foregoing may be provided with appropriate logic for dealing with the relative reliability of data from different sources, and when such data is good enough to indicate that a change of address has occurred. Corroboration of a move from two or more local sources can be used as a criterion for improving a confidence level that a move has in fact occurred. Some local sources of information may develop a track record for reliability, while others may over time prove to have a high error rate. According to a further aspect of the invention, the hit/miss rate of a given local source of information is tracked and later taken into account in assigning a confidence level to the change of address data from that source.

In some cases, the external or local data source suggests that a move has occurred, but does not indicate a new address. The user, for example, may see an entry for John Q. Doe that lists a last known postal address (from NOCA) and an additional note that the property at that address was recently sold, according to local real estate records, from John Q. Doe to someone else, suggesting that a mailing to that address may not reach the intended recipient.

For legal reasons related to privacy (such as court orders), the information made available to the customer may not include the updated address even if that address is known with a high level of confidence in the enhanced database. However, the subscriber may still be interested in knowing, for example, that a change of address has occurred at a certain address or for a certain individual, even if the change of address information cannot be given out without the individual's permission or until it becomes publicly known. A utility, for example, may be interested in knowing that one or more addresses are flagged with frequent changes of address for purposes of deciding to continue or terminate service at that address.

Figure 2:
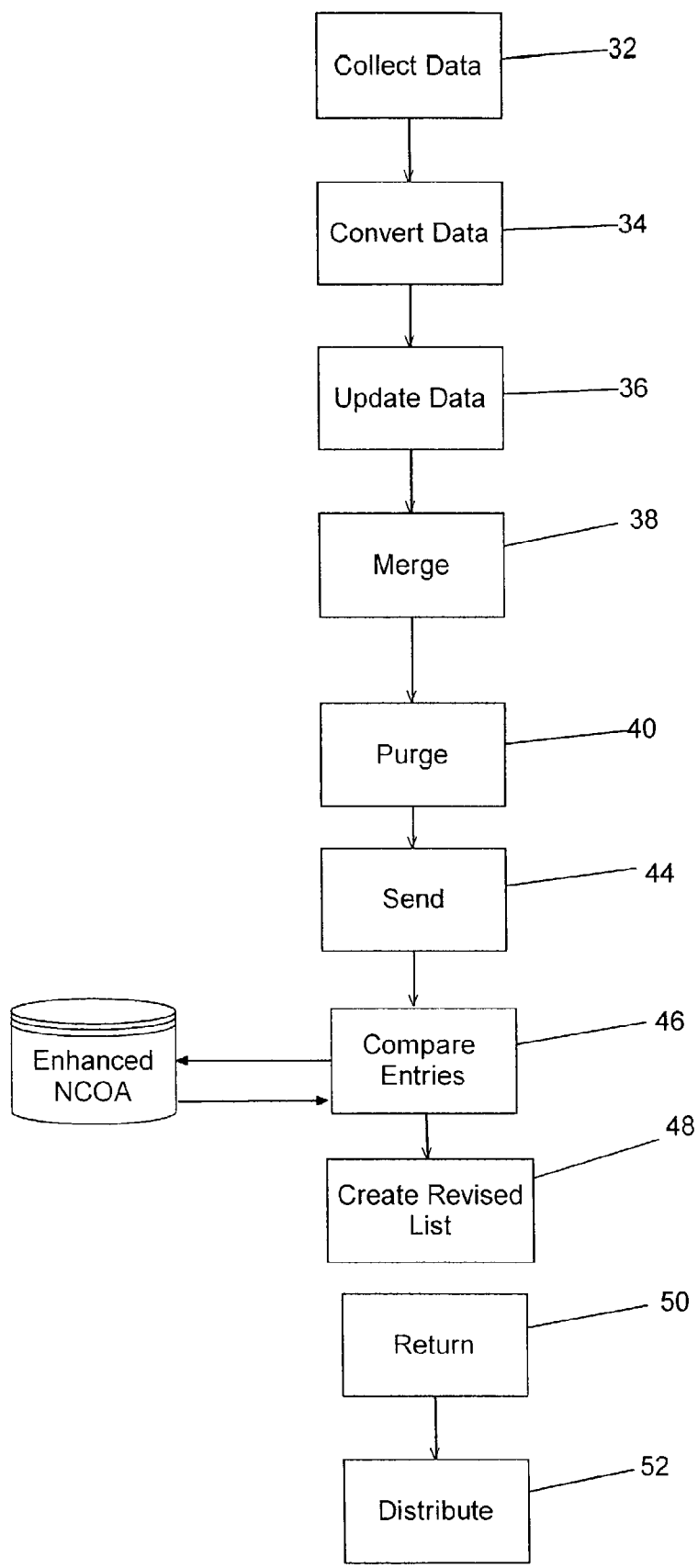
FIG. 2 is a flow chart of a process of the invention for providing updated address data to a mailing list provider.

FIG. 2 illustrates a process by which a direct mailer, list provider or other subscriber would utilize the enhanced COA database of the invention. As described above, such a subscriber normally creates a mailing list by going through successive steps of data collection (step 50), format conversion (step 52), updating of address data (step 54) and purging of addresses listed on do not mail lists (step 56). These steps may be followed by a step of merging two or more such lists together into a master mailing list (step 58). These steps may be repeated each time the master list is used, or only after a certain time interval has passed.

In one option according to the invention, such as would be used by commercial mailing list providers, the master mailing list is then sent to server 11 the entity operating the enhanced database (step 60) in a predetermined format by email, FTP, or the like. Names and addresses on the master mailing list are then compared to corresponding entries in the enhanced database (step 62), and a computer generated revised mailing list is prepared by server 11 (step 64). The revised list will, for example, including an updated name or address obtained from local data as discussed above, if considered reliable, or may delete addresses from the list based on current information from local data or external sources. The list provider receives back the enhanced list (step 66) and distributes it to its clients (step 68). The process is repeated on a periodic basis as agreed between the database operator and the subscriber.

Figure 3:
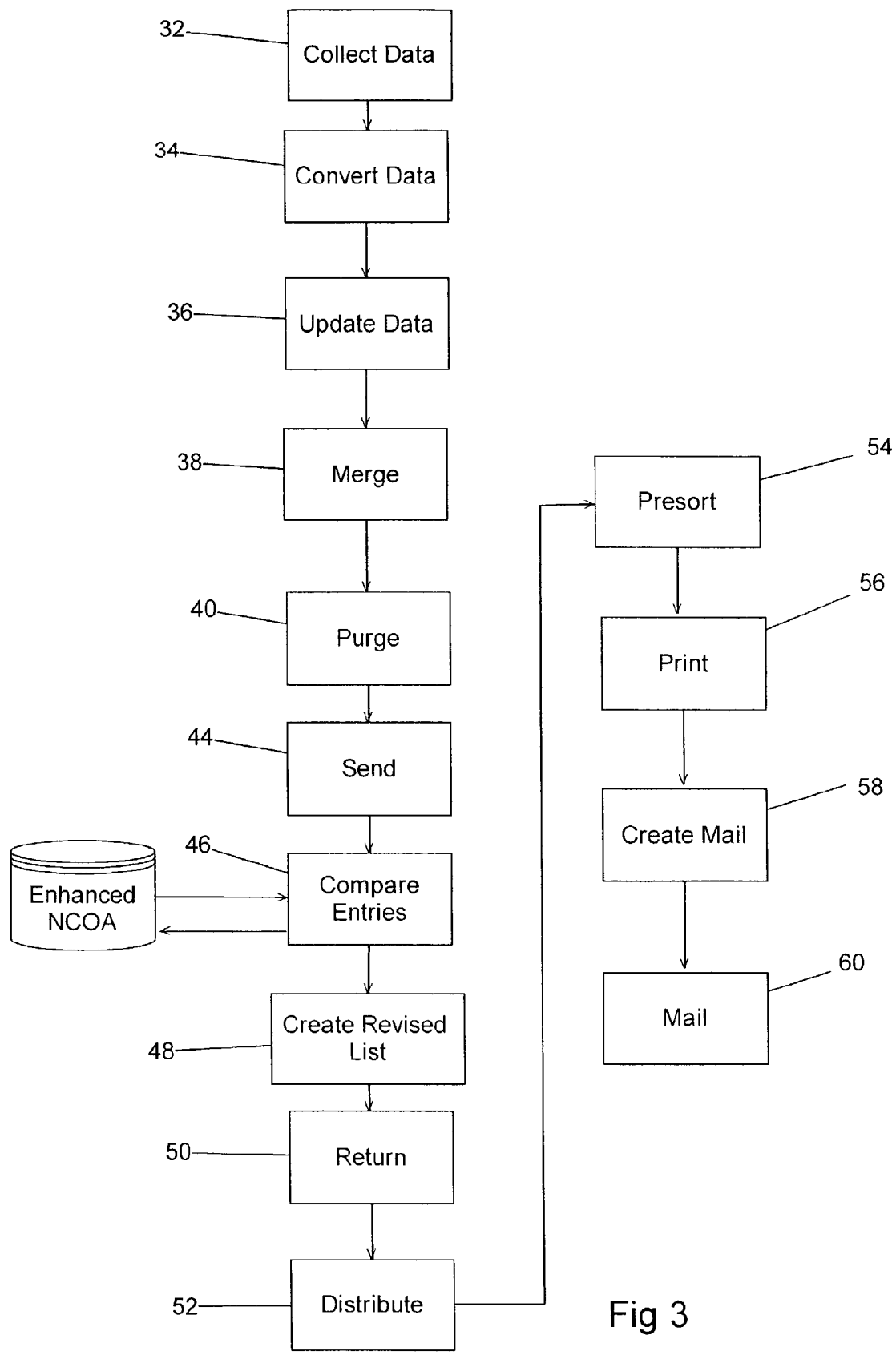
FIG. 3 is a flow chart of a process of the invention for providing updated address data to a bulk mailer.

In another embodiment described in FIG. 3, the subscriber is a bulk mailer that carries out steps (50)-(58) in essentially the same manner as the mailing list provider. The mailing list is then revised in view of differences found in the enhanced database (steps 60, 62, 64). The mailer then electronically presorts the addresses for the mailing according to the revised list (step 70). The mail is then printed in sequence (step 72) and the mail pieces created (step 74) and then mailed (step 76).

The enhanced database server 11 can also provide reports to customers including indicators derived from long-term statistics. For example, if a single address has been the subject of more than a certain number of moves in a period of time, for example, then a frequent moves flag can be set for that address. The historical database can be accessed to obtain this information. Demographic information can also be compiled from move statistics and provided to interested parties such as advertisers.

Although various embodiments of the invention have been illustrated in the accompanying drawing and described in the foregoing detailed description, it will be understood that the invention is not limited to the embodiments disclosed but, as will be appreciated by those skilled in the art, is susceptible to numerous modifications and variations without departing from the spirit and scope of the invention as hereinafter claimed. For example, the weekly database used by the customer may be provided directly by the USPS, rather than from server 11.

We claim:

1. A method for providing postal patron address change information to subscribers that utilize mailing lists comprising names and address of such patrons, wherein a national postal service maintains a master change of address database that is updated on an intermittent basis by the national postal service, comprising:
    (a) receiving intermittent updates to the master change of address database and incorporating the updated change of address information into a computer-searchable, enhanced change of address database;
    (b) receiving change of address data from sources other than the national postal service and other than from postal patrons who are submitting address change information;
    (c) incorporating more recent change of address information received from such sources into the enhanced change of address database; and
    (d) distributing information from the enhanced database to one or more of the subscribers in a form in which the subscribers can use addresses corrected by information from the enhanced database to prepare a mailing, wherein steps (b)-(d) are executed in an interim period between receiving of updates in step (a), such that the enhanced change of address database during such interim period contains change of address data more recent than corresponding entries in the master change of address database.

2. The method of claim 1, further comprising making changes in a machine-readable mailing list used by the subscriber when the information from the enhanced database distributed in step (d) indicates a change of address has occurred.

3. The method of claim 2, further comprising sending a mass mailing to customers of the subscriber using one or more addresses corrected by information from the enhanced database.

4. The method of claim 1, wherein the sources used in step (b) include at least one of commercially available mailing lists and lists provided by government entities other than the national postal service.

5. The method of claim 1, further comprising updating the enhanced database with local change of address information forwarded to the enhanced database by the subscribers who receive information from the enhanced database.

6. The method of claim 5, further comprising updating the enhanced database with local change of address information forwarded to the enhanced database by customers, which information is combined with the daily change of address data due for inclusion in the master database.

7. The method of claim 1, wherein the master postal change of address database is updated on a weekly basis, further comprising updating the enhanced database with daily change of address data due for inclusion in the master database before the master database is updated to include such daily data.

8. The method of claim 1, further comprising creating copies of the enhanced database on a plurality of subscriber servers.

9. The method of claim 1, wherein step (d) further comprises creating an address change lookup table, and providing subscribers access to the lookup table.

10. The method of claim 9, wherein step (d) further comprises:
    receiving a mailing list from the subscriber;
    preparing a revised version of the mailing list using data corresponding to addresses on the subscriber's mailing list from the enhanced database; and
    sending the revised mailing list to the subscriber.

11. The method of claim 1, wherein the sources other than the master change of address database and postal patrons includes one or more of an address alias database, a name alias database, a temporary moves database, credit card company change of address records, theft of identity records, police hot lists, death records, real estate records, records of federal agencies other than the postal service, state government databases, electronic address lists on the Internet, and electronic telephone listings on the Internet.

12. The method of claim 1, wherein step (d) further comprises encrypting information to be distributed from the enhanced database to a subscriber, and decrypting the information upon receipt by the subscriber.

13. A system for providing postal patron address change information to subscribers that utilize mailing lists comprising names and address of such patrons, wherein a national postal service maintains a master change of address database that is updated on an intermittent basis by the national postal service, comprising:
    means for electronically receiving intermittent updates to the master change of address database;
    means for electronically receiving change of address data from sources other than the national postal service and other than from postal patrons who are submitting address change information;
    a computer searchable, enhanced change of address database;
    means for electronically incorporating more recent change of address information received from such sources into the enhanced change of address database, whereupon the distributed information contains change of address data more recent than corresponding entries in the master change of address database; and
    means for distributing change of address information from the enhanced database to one or more of the subscribers in a form in which the subscribers can use addresses corrected by information from the enhanced database to prepare a mailing, wherein the distributed information contains change of address data more recent than corresponding entries in the master change of address database.

14. The system of claim 13, wherein the means for distributing change of address information from the enhanced database comprises means for creating copies of the enhanced database on a plurality of subscriber servers.

15. The system of claim 14, wherein the means for distributing change of address information from the enhanced database includes a data storage device containing a copy of the enhanced database thereon.

16. The system of claim 15, wherein the data storage device is a CD or DVD.

17. The system of claim 13, wherein the means for distributing change of address information from the enhanced database comprises means for creating an address change lookup table, and for providing subscribers access to the lookup table.

18. A method for providing postal patron address change information to subscribers that utilize mailing lists comprising names and address of such patrons, wherein a national postal service maintains a master change of address database that is updated on an weekly basis by the national postal service, comprising:

(a) receiving periodic updates to the master change of address database and incorporating the updated change of address information into a computer-searchable, enhanced change of address database;

(b) receiving change of address data from sources other than the national postal service and other than from postal patrons who are submitting address change information;

(c) incorporating change of address information received in step (b) into the enhanced change of address database in an interim period between receiving of updates in step (a) such that the enhanced change of address database during such interim period contains change of address data more recent than corresponding entries in the master change of address database.

19. The method of claim 18 further comprising;

(d) providing access to the enhanced database to one or more of the subscribers in a form in which the subscribers can use addresses corrected by information from the enhanced database to prepare a mailing.

20. The method of claim 18 further comprising the step of validating changes to the enhanced database by checking change of address information received from sources other than the national postal service and other than from postal patrons who are submitting address change information against a national database of valid addresses.

* * * * *